United States Patent [19]
Lockwood

[11] 3,765,608
[45] Oct. 16, 1973

[54] AUTOMATIC INTERMITTENT BREAK-UP DEVICE

[76] Inventor: James F. Lockwood, Wilton Manors, Fla.

[22] Filed: Apr. 11, 1972

[21] Appl. No.: 243,007

[52] U.S. Cl. ............................. 239/230, 239/231
[51] Int. Cl. ............................................. B05b 3/08
[58] Field of Search.................... 239/230, 231, 232, 239/233

[56] References Cited
UNITED STATES PATENTS
3,623,666  11/1971  Meyer................................. 239/230

FOREIGN PATENTS OR APPLICATIONS
1,076,772  10/1954  France............................. 239/231
324,116   8/1957   Switzerland........................ 239/230

Primary Examiner—M. Henson Wood, Jr.
Assistant Examiner—Michael Y. Mar
Attorney—Eugene F. Malin

[57] ABSTRACT

An automatic intermittent break-up device repeatedly movable toward the center of the fluid stream exiting a nozzle to a first position to increase the break-up of the stream and movable away from the center of the fluid stream exiting the nozzle to a second position to decrease the break-up. The increased break-up sequence of operation provides a more desired distribution of fluid on the surface area. The intermittent break-up device includes an adjustable break-up member or screw. The member is connected to an automatic mechanism of an irrigation device to drive the member into the first position when the irrigation device delivers fluid over a particular area of the ground and drives the member into the second position when the irrigation device subsequently delivers fluid over the said particular area of the ground.

7 Claims, 2 Drawing Figures

PATENTED OCT 16 1973 3,765,608

AUTOMATIC INTERMITTENT BREAK-UP DEVICE

BACKGROUND OF THE INVENTION

This invention relates to a new and improved automatic break-up device, and more particularly, to a break-up device movable in the stream to a first position to increase the break-up of the stream exiting a nozzle when the irrigation device delivers fluid over a particular area of ground, and movable away from the first position to decrease the break-up of the stream when the irrigation device subsequently delivers fluid over the said particular area of ground.

In the past, break-up screws fixed to a sprinkler device have been used to provide a fixed distribution pattern. Break-up screws are provided for sprinkler heads because of the inability of the basic head and nozzle to distribute water in a desired pattern. Also, movable break-up devices connected to the drive arm of a rotating sprinkler have been designed to rapidly move into and out of a stream exiting the nozzle each time the sprinkler head is moved in a step-by-step movement.

BRIEF DESCRIPTION OF ONE EMBODIMENT OF THE INVENTION

The automatic adjustable break-up device includes a break-up member connected to an automatic drive mechanism for intermittently driving a break-up member toward the center line of the fluid stream exiting the nozzle and thereafter driving the break-up member away from the center line of the fluid stream exiting the nozzle to a second position. The break-up device is movable into the first position to increase break-up of the stream while the irrigation device distributes fluid over a given area of ground and subsequently movable into the second position away from the center of the stream to decrease break-up while the irrigation device distributes fluid over said given area of ground. The total distribution pattern on said area of ground is the sum of the increased break-up distribution and the decreased break-up distribution.

In one embodiment illustrating the invention, the irrigation head includes a base fixed to the fluid supply system, a rotatable stem with one end connected to the base, a nozzle connected to the stem and a movable vane driven hammer movably connected to the stem. The hammer is driven by the exiting stream of fluid from the nozzle and in turn drives the stem and nozzle in clockwise and counterclockwise movement. The irrigation head includes a reversing mechanism movable from a first position to a second position to alter the direction of rotation of the stem and nozzle. The adjustable break-up device includes a break-up member connected to the moving reversing mechanism to position the break-up device in the first position to increase break-up distribution over a particular ground area and to subsequently position the break-up device in the second position to decrease break-up distribution over the said particular ground area in order to provide a more desirable distribution pattern.

It is an object of this invention to irrigate automatically first with an unbroken stream and then with a broken stream of fluid in a repetitive manner.

Another object of this invention is to increase the break-up of a stream distributed over one area of ground and subsequently decrease the break-up of the stream distributed over the same area of ground.

Another object of this invention is to provide a break-up member automatically moved toward and away from the line center of the stream exiting nozzle without affecting the speed of movement of the nozzle.

It is another object of this invention to provide a plurality of fluid distribution patterns for an irrigation means by automatically moving a break-up member relative to a stream exiting a nozzle when fluid is subsequently distributed over one area of ground.

A further object of this invention is to provide a break-up member movable relative to the exiting stream of a nozzle each time a sprinkler head reverses the direction of movement of the nozzle.

In accordance with these and other objects which will be apparent hereinafter, the instant invention will now be described with particular reference to the accompanying drawing.

DESCRIPTION OF A PREFERRED EMBODIMENT

Figure 1:
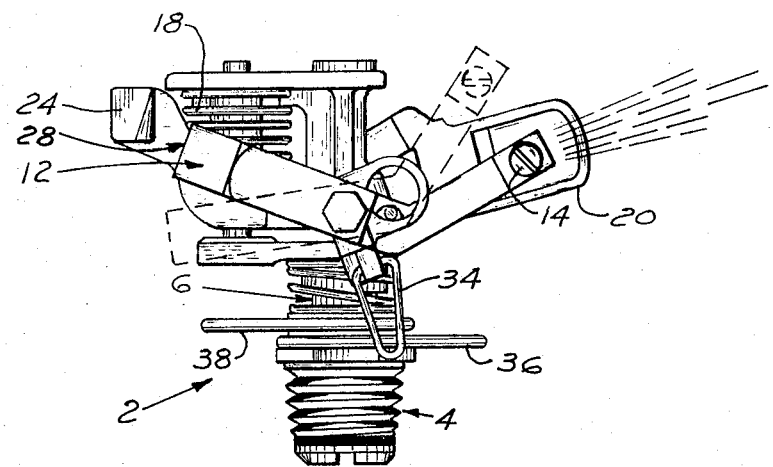
FIG. 1 is a side view of an impact arm type sprinkler device showing the automatic break-up device in one break-up position and illustrating a second position in dotted lines.
Figure 2:
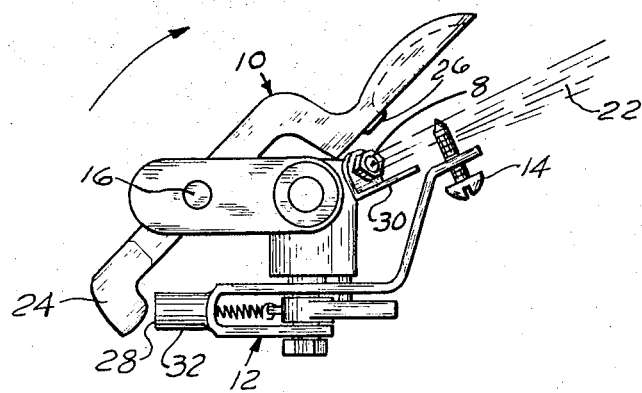
FIG. 2 is a top view of the sprinkler device as shown in FIG. 1.

Referring now to the drawing and in particular to the embodiment of the invention as shown in FIGS. 1 and 2, the rotary irrigation head 2 is illustrated as a reversing-impact arm type sprinkler. The irrigation head includes a base 4, a stem 6, nozzle 8, reaction arm 10, a reversing mechanism 12, and an adjustable break-up member or screw 14. The base 4 is threaded at one end for connecting the base to a fluid distribution system. The stem 6 is rotatably connected to the base 4 for rotational movement about the main vertical center line. As illustrated in this particular embodiment, the stem and nozzle are driven by reaction arm 10. The reaction arm 10 is pivotably connected to the stem by pin 16 and biased in the direction of the arrow in FIG. 2 by return spring 18. The reaction arm 10 is driven by the exit stream 22 engaging the vane means 20. The reaction arm 10 includes hammer portions 24 and 26 which are driven against the anvil portion 28 on the reversing mechanism 12 and the stem anvil portion 30 connected to the stem. The hammer portion 26 strikes the anvil portion 30 to rotate the stem in one direction and then hammer portion 24 strikes anvil 28 to cause rotation in the opposite direction after the reversing mechanism 12 moves anvil portion 28 into position.

The reversing mechanism 12 includes a movable body portion 32 with anvil 28 at one end of the body portion and the adjustable break-up screw 14 connected to the opposite end of the body portion. The stem 6 is driven in one direction with the reversing mechanism in one position as shown in FIG. 1 by the solid lines, and the stem is thereafter driven in the opposite direction with the reversing mechanism in a second position as illustrated in FIG. 1 by the dotted lines. The reversing mechanism is actuated by the engagement of projecting member 34 engaging boundary limiting members 36 connected to the base 4. When the body portion 32 is in the position shown by solid lines in FIG. 2 the break-up screw 14 is in position to engage the stream exiting nozzle 8. The adjustable break-up screw 14 continues to break up the stream during the complete half cycle of movement of the stem and nozzle. The reversing mechanism 12 and body portion 32 rotate with the stem 6. The distribution pattern is changed when the movement of the stem and nozzle are reversed. The projecting member 34 engages a boundary limiting member 38 and moves the body portion 32 into the position illustrated by dotted lines in FIG. 1. The stream is unbroken when the body portion is in the position illustrated by the dotted lines.

This invention overcomes the inability of the nozzle to vary the stream break-up pattern. Also this invention utilizes the desirable characteristics of the uninterrupted stream exiting the nozzle. Both the uninterrupted stream characteristics and the interrupted stream characteristics are utilized to provide a more desirable overall distribution pattern.

It should be noted that this invention may be connected to other types of well known reversing sprinkler heads. Also the adjustable break-up member may be placed on turbine driven sprinkler head. The adjustable break-up member may be driven by an automatic shift mechanism driven by the rotating head or the turbine drive.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An automatic intermittent stream break-up means for an irrigation device with an exit nozzle comprising:
    a break-up member connected to the irrigation device, said break-up member movable into a first position placing at least a portion of the break-up member in the path of the fluid stream that exits the nozzle thereby causing continuous breakup of the fluid stream of the irrigation device when the fluid stream sweeps a distribution area, said break-up member movable into a second position such that the break-up member causes less continuous break up of the fluid stream that exits the nozzle of the irrigation device when the fluid stream sweeps the distribution area, and
    an automatic mechanism connected to the break-up member for moving the break-up member from said first position to said second position.

2. An automatic intermittent stream break-up device for an irrigation device with an exit nozzle, as set forth in claim 1 wherein,
    said automatic mechanism alternately moves the break-up member from said first position to said second position.

3. An automatic intermittent stream break-up device for an irrigation device with an exit nozzle, as set forth in claim 2 wherein,
    said automatic mechanism alternately and repetitively moves the break-up member from said first position to said second position.

4. An automatic intermittent stream break-up device for an irrigation device with an exit nozzle, as set forth in claim 2 including,
    an oscillating irrigation device including an oscillating nozzle.

5. An automatic intermittent stream break-up device for an irrigation device with an exit nozzle, as set forth in claim 4 wherein,
    said irrigation device including a reversing mechanism,
    said break-up member connected to said oscillating nozzle and,
    said automatic mechanism connected to said reversing mechanism to change the position of said break-up member.

6. An automatic intermittent stream break-up device for an irrigation device with an exit nozzle, as set forth in claim 2 including,
    a rotating irrigation device with a turbine drive.

7. An automatic intermittent stream break-up device for an irrigation device with an exit nozzle, as set forth in claim 6 wherein,
    said break-up member connected to said turbine drive in said irrigation device, and
    said automatic mechanism connected to said turbine drive to change the position of said break-up member.

* * * * *